United States Patent [19]

Okazaki

[11] Patent Number: 5,002,366
[45] Date of Patent: Mar. 26, 1991

[54] SCANNING APPARATUS FOR READING AN ORIGINAL IMAGE

[75] Inventor: Noritaka Okazaki, Kadoma, Japan
[73] Assignee: Mita Industrial Co., Ltd., Japan
[21] Appl. No.: 421,973
[22] Filed: Oct. 13, 1989
[30] Foreign Application Priority Data Oct. 21, 1988 [JP] Japan .................................. 63-266701
Oct. 21, 1988 [JP] Japan .................................. 63-266702
Oct. 21, 1988 [JP] Japan .................................. 63-266703

[51] Int. Cl.$^5$ ........................ G03B 15/28; G02B 26/08
[52] U.S. Cl. ..................................... 350/321; 355/233
[58] Field of Search ................. 350/6.1, 6.5, 6.6, 321;
346/160; 355/228, 233, 235, 245

[56] References Cited

U.S. PATENT DOCUMENTS 4,645,329 2/1987 Iwaki ..................................... 355/233
4,708,486 11/1987 Watanabe ............................. 355/233

*Primary Examiner*—Paul M. Dzierzynski
*Assistant Examiner*—James Phan
*Attorney, Agent, or Firm*—Beveridge, DeGrandi & Weilacher

[57] ABSTRACT

A scanning apparatus of a copying machine includes a first moving frame and a second moving frame constituting a movable optical system for reading an original image; a toothed belt suspended between a pair of pulleys such that the toothed belt is endlessly movable; the first moving frame being fixed; a second moving frame driving pulley installed on the second moving frame and which is driven by the toothed belt; a friction roller which rotates in a body with the second moving frame driving pulley; and a stationary friction plate installed so as to be brought in contact with the friction roller. The scanning apparatus has a simple construction, and a stable and high performance in reading an original image can be obtained.

10 Claims, 9 Drawing Sheets

SCANNING APPARATUS FOR READING AN ORIGINAL IMAGE

BACKGROUND OF THE INVENTION

1. Field of the Invention

The present invention relates to a scanning apparatus for reading an original image of a copying machine.

2. Description of the Prior Art

The scanning apparatus for reading the original image of an original-fixed type copying machine is designed to optically scan an original placed on an original table by an exposure unit of the apparatus, thereby a latent image is produced on a photoreceptor of a recording part of the copying machine. The exposure unit usually consists of the following two moving frames: a first moving frame including an exposure light source such as an exposure lamp which emits light toward the original table, and a reflecting member such as a mirror which reflects the light reflected at the original in a predetermined direction; and a second moving frame including a reflecting member such as a mirror which reflects the light reflected by the reflecting member of the first moving frame in a direction where a lens is positioned.

Conventionally, in order to scan the original, a mechanism having a wire and pulleys (hereinafter, referred to as "wire and so on") has been mainly adopted as drive transmitting means which moves the first and second moving frames. However, in the case of transmitting drive power of a motor by using the wire and so on, it is easy for slipping to occur, further, if the wire is wound by many turns to prevent this, a problem is produced that assembling work is quite inefficient.

Additionally, if the wire and so on are utilized, it is difficult to hold well-balanced initial tension of the wire on the respective ends of the first and second moving frames. Moreover, the wire tends to be lengthened due to repetition of the scanning operation by the exposure unit, therefore it becomes necessary to make adjustment again because the elongation of the wire is different between the respective end portions due to unevenness in the properties of the matter of the wire. And it requires a lot of time to make such adjustment.

For the purpose of solving the above-described problem, there have been proposed scanning apparatuses in which toothed belts are employed as the drive transmitting members in place of the wires and so on. For example, Japanese Patent Laid-Open Publication No. 110128/1986 discloses such drive transmitting means as shown in FIG. 1. According to this prior art, on each outside of side plates 156 and 157, a toothed belt 168, on which the first moving frame is fixed, is secured at its one end by a fixing member 169, extended to wrap around a toothed pulley 166 installed on the second moving frame to fold back, next, wrapped around a driving pulley 162 to fold back in the original direction, further wrapped around a driven pulley 163, finally wrapped around a toothed pulley 167 installed on the second moving frame together with the toothed pulley 166, and thereafter secured to each side plate by a fixing means 170. Thus, the first and second moving frames are driven by the wrapping connector drive of the toothed belt 168.

In addition, Japanese Patent Laid-Open Publication No. 42142/1987 discloses another construction of the drive transmitting means as shown in FIG. 2. The first moving frame is fixed at each end on a toothed belt 138 which connects a driving pulley 134 and a driven pulley 136, while the second moving frame is fixed at each end on a toothed belt 144 which connects two toothed pulleys 140 and 142 having a different diameter from the driven pulley 136 and the driving pulley 134 respectively. Thus, the first and second moving frames are reciprocated by the drive of the toothed belts 138 and 144 respectively.

However, according to the above-described former prior art, since one portion of the toothed belt 168 has to take a double-toothed shape, it cannot be said to be of practical use due to difficulty in manufacturing such a peculiar shaped toothed a belt. In addition, belt fixing member is required to fix both end portions of the toothed belt 168, and adjustment of the length of the belt is difficult. On the other hand, according to the latter prior art, one belt is needed for one end portion of each moving frame, which not only increases cost because a total of four belts are needed, but also complicates the construction of the apparatus itself, and further, in mass-production, leads to more than a little trouble due to the unevenness in the properties of the matter of the belt.

SUMMARY OF THE INVENTION

It is an object of the present invention to provide a scanning apparatus having a simple construction and a high degree of accuracy in reading an original image.

In accordance with one feature of the present invention, the scanning apparatus for reading the original image comprises:

a first moving frame and a second moving frame constituting a movable optical system for reading the original image;

a toothed belt suspended between a pair of pulleys, the toothed belt being endlessly movable, the first moving frame being fixed;

a second moving frame driving pulley installed on the second moving frame, and which is driven by the toothed belt;

a friction roller which rotates in a body with the second moving frame driving pulley; and a stationary friction plate installed so as to be brought in contact with the friction roller.

According to the above-described construction, a pair formed by the second moving frame driving pulley and the friction roller are provided, however, two or more pairs may be provided in place thereof, which brings about an advantage that stable reciprocating movement of the second moving frame is obtainable.

Next, in accordance with another feature of the present invention, the scanning apparatus for reading the original image comprises:

a first moving frame and a second moving frame constituting a movable optical system for reading the original image;

a toothed belt suspended between a pair of pulleys, the toothed belt being endlessly movable, the first moving frame being fixed;

a second moving frame driving pulley installed on the second moving frame, and which is driven by the toothed belt; and a stationary rack positioned along the toothed belt, and which is engaged with the second moving frame driving pulley.

According to this feature, the first moving frame shifts at the same velocity as the toothed belt, while the second moving frame stably shifts at a predetermined lower velocity than the first moving frame because the second moving frame driving pulley rotates in engagement with the rack by the drive of the toothed belt.

In the scanning apparatus according to either feature above-described, it is unnecessary to provide the fixing means for the belt and to adjust the length thereof owing to the adoption of the toothed belt. Furthermore, since the belt is designed to be simply suspended, the assembling work for the apparatus and adjustment of the initial tension is made easy. Moreover, the scanning apparatus has a simple construction including one or two belts at most, which gives advantageously stable performance, causing little trouble based on unevenness in the properties of the matter of the belt or inequality in the adjustment of each scanning apparatus.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Hereinafter, an embodiment of the present invention will be described with reference to the drawings.

Figure 1:
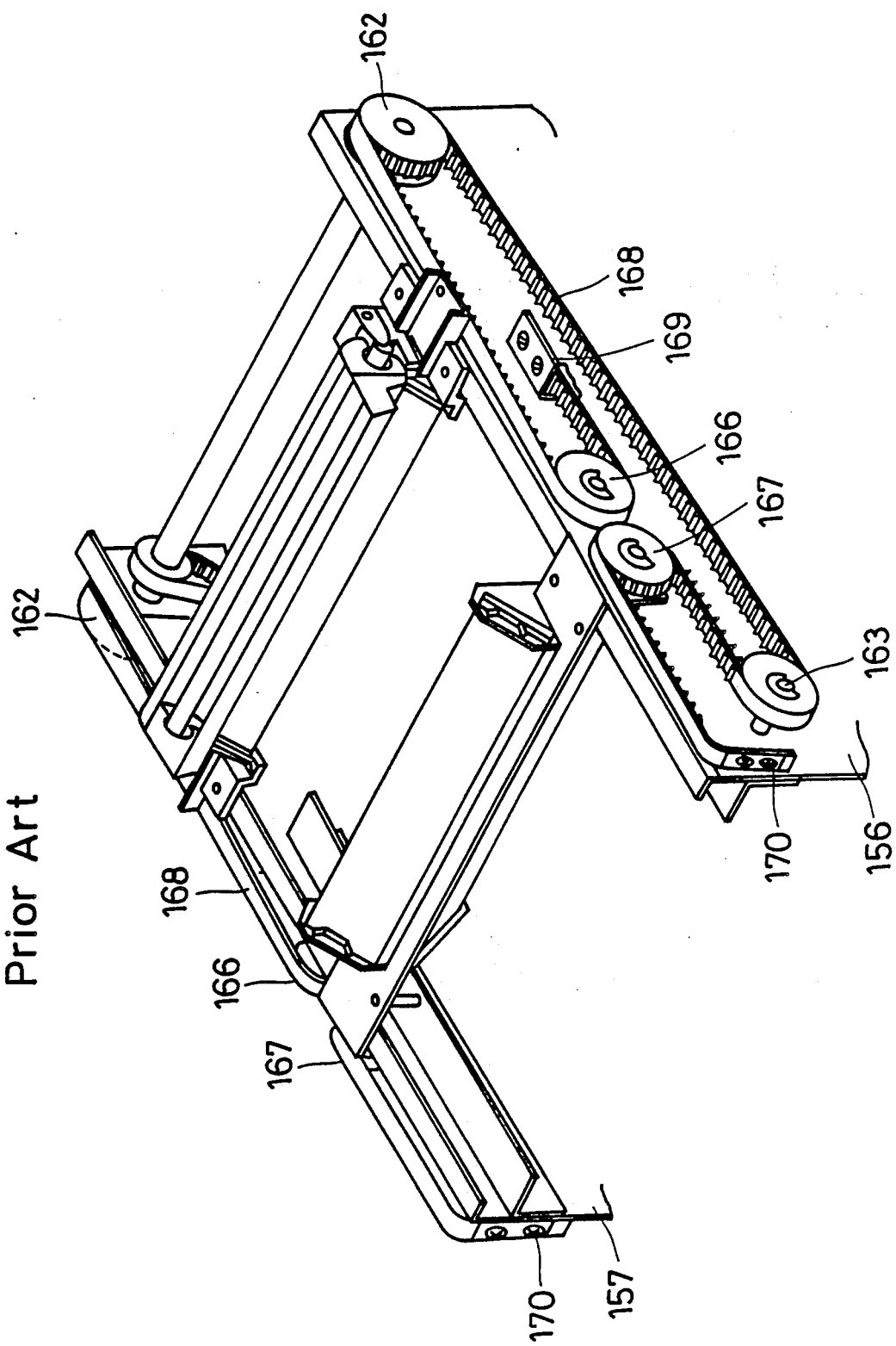
FIG. 1 is a perspective view of a conventional scanning apparatus.
Figure 2:
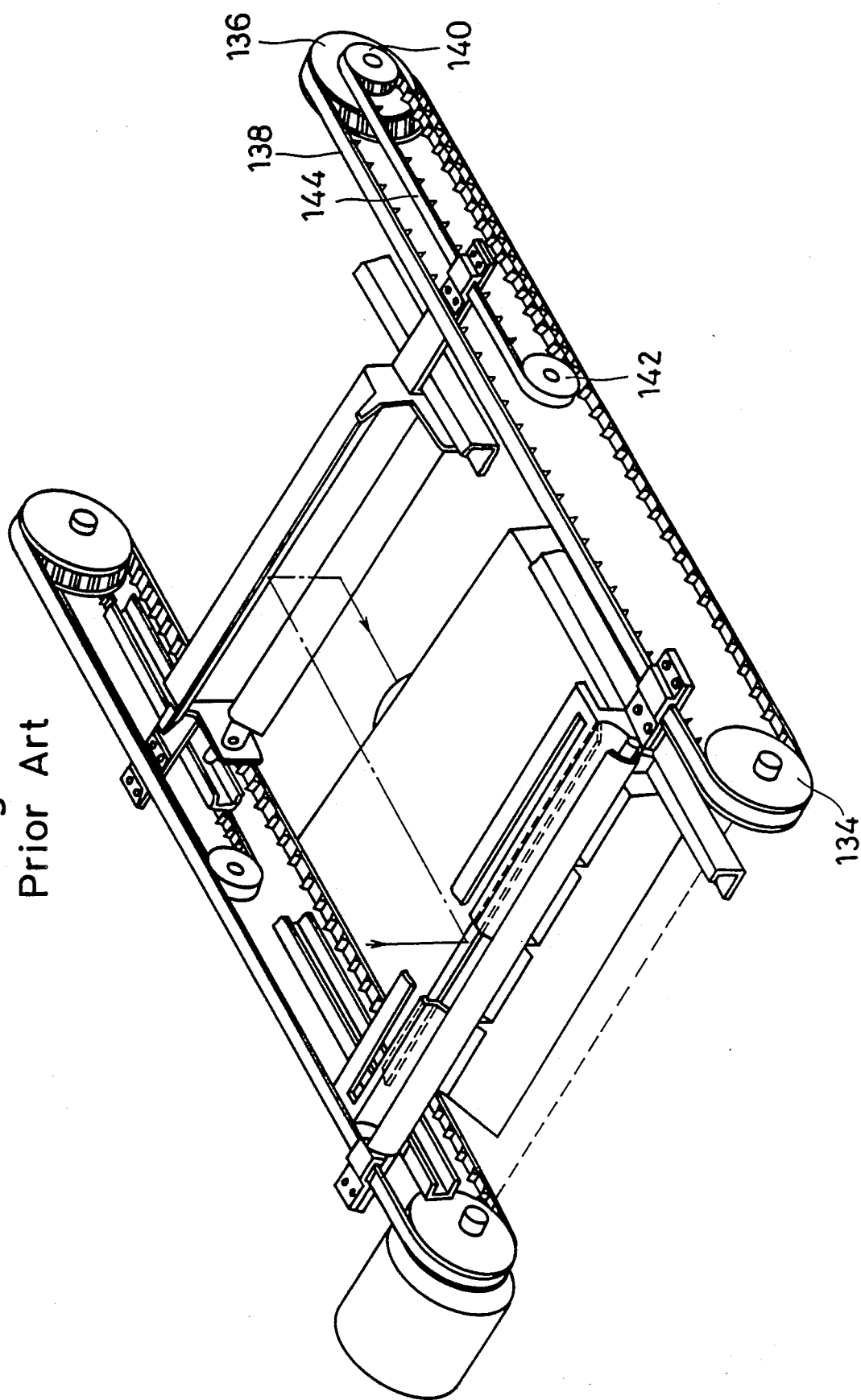
FIG. 2 is a perspective view of another conventional scanning apparatus.
Figure 3:
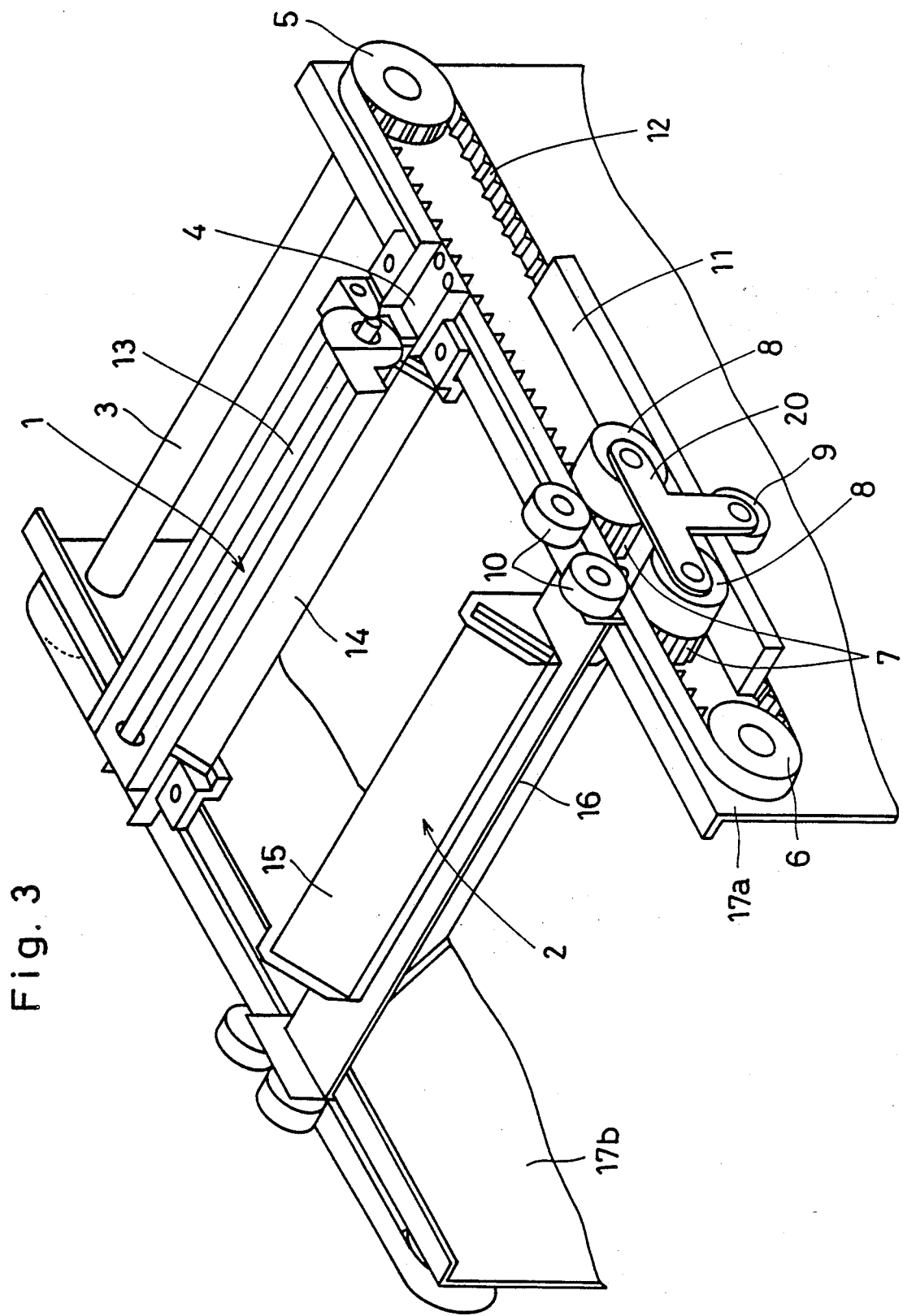
FIG. 3 is a perspective view of a first embodiment of the scanning apparatus having the construction in accordance with the present invention.
Figure 4:
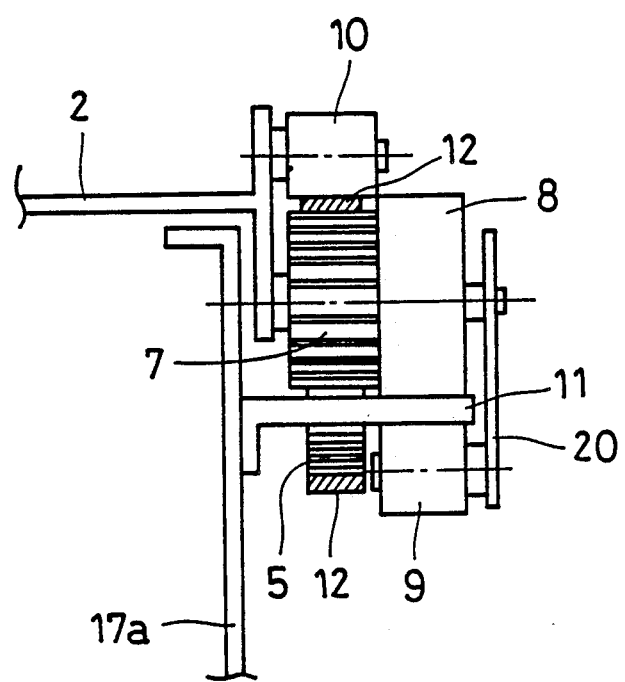
FIG. 4 is a sectional view of an essential portion of the scanning apparatus of FIG. 3.

FIG. 3 is a perspective view of the scanning apparatus embodying the present invention. FIG. 4 is a sectional view showing an essential portion of FIG. 3.

The exposure unit is constituted with a first moving frame 1 and a second moving frame 2. The first moving frame mainly comprises an exposure lamp 13, a mirror 14 and a fixed portion 4 which is fixed to a toothed belt 12 (hereinafter, referred to as "belt") on each end of the first moving frame 1. The first moving frame 1 is so installed as to reciprocate along side plates 17a and 17b of the optical system which stand in parallel with each other on both ends of the first moving frame 1, thereby, the scanning operation for reading an image of the original placed on the original table can be performed while the exposure lamp 13 emits light toward the original table. Simultaneously, the mirror 14 reflects the light reflected at the original table toward the second moving frame 2.

On the other hand, the second moving frame 2 comprises the following constituent parts: a mirror 15 which reflects the light from the first moving frame 1 toward a mirror 16; a mirror 16 which reflects the light from the mirror 15 toward a lens (not illustrated in FIG. 3) forming a latent image on a photoreceptor drum; and a pair of auxiliary pulleys 10 which press the belt 12 onto second moving frame driving pulleys 7. Though the auxiliary pulleys 10 are not always necessary for the construction of the present embodiment, they are installed on the second moving frame as required. However, in pursuit of a stable movement of the second moving frame 2, it is preferable to provide the auxiliary pulleys 10 for the firm engagement between the second moving frame driving pulleys 7 and the belt 12.

The drive transmitting means comprises a driving shaft 3 connected to a motor (not illustrated), a driving pulley 5, two second moving frame driving pulleys 7, the belt 12 and so on. The belt 12 having teeth on the inside is suspended to be moved endlessly between the driving pulley 5 connected to the driving shaft 3 and a driven pulley 6. Two friction rollers 8 which rotate in a body with the second moving frame driving pulleys 7 interlock with the belt 12 by the rotation of the driving pulley 5 to rotate on a stationary friction plate 11 installed on each outside of the side plates 17a and 17b. The diameter of the friction rollers 8 is the same as that of a pitch circle of the second moving frame driving pulleys 7. Each of the friction rollers 8 is on its shaft portion connected to a pressing roller 9 through a connecting plate 20. The pressing roller 9 presses the friction plate 11 in cooperation with the friction rollers 8 while moving with the second moving frame 2. The pressing roller 9 is not always necessary for the construction of the present invention, however, as shown in FIG. 3, the pressing roller 9 is preferably provided in order to prevent the friction rollers 8 from slipping on the friction plate 11.

As appreciated from the above-described construction of this first embodiment in which two pairs of the second moving frame driving pulley 7 and the friction roller 8 rotating in a body with the second moving frame driving pulley 7 are provided (only one pair is also applicable), the friction rollers 8 and the friction plate 11 serve as a slider and a slider rail respectively. Accordingly, even if the slider and the slider rail are not provided, the stable movement of the second moving frame 2 is established as compared with the construction including only one pair formed of the second moving frame driving pulley and the friction roller rotating in a body therewith. Furthermore, more than two pairs of the second moving frame driving pulley 7 and the friction pulley 8 may be provided.

For the purpose of the adjustment of initial tension of the belt 12, it is preferable to provide installing means on the driven pulley 6 or each of the side plates 17a and 17b so that the driven pulley 6 may move in parallel with the moving direction of the second moving frame 2. The friction plate 11 may be perfectly fixed on each outside of the side plates 17a and 17b, or may be fixed by using proper installing means so that the installing position may be adjusted as required. In the case of a perfectly fixed installment, the adjustment is performed in the process of the assembling work of the apparatus by controlling the installing position of the friction plate 11.

The exposure unit (movable optical system) constituted with the first moving frame 1 and the second moving frame 2 is designed to reciprocate on the side plates 17a and 17b by means of the drive transmitting means consisting of the driving pulley 5, driven pulley 6, belt 12, second moving frame driving pulleys 7, friction rollers 8, friction plate 11 and so on. At this time, the second moving frame 2 moves in the same direction as the first moving frame 1 at half the velocity of the first moving frame 1. The drive transmitting means may be provided on both sides of the first and second moving frames 1, 2, or may be provided only on one side. When it is provided only on one side, the initial tension of the belt 12 can be advantageously set in a short time.

Figure 5:
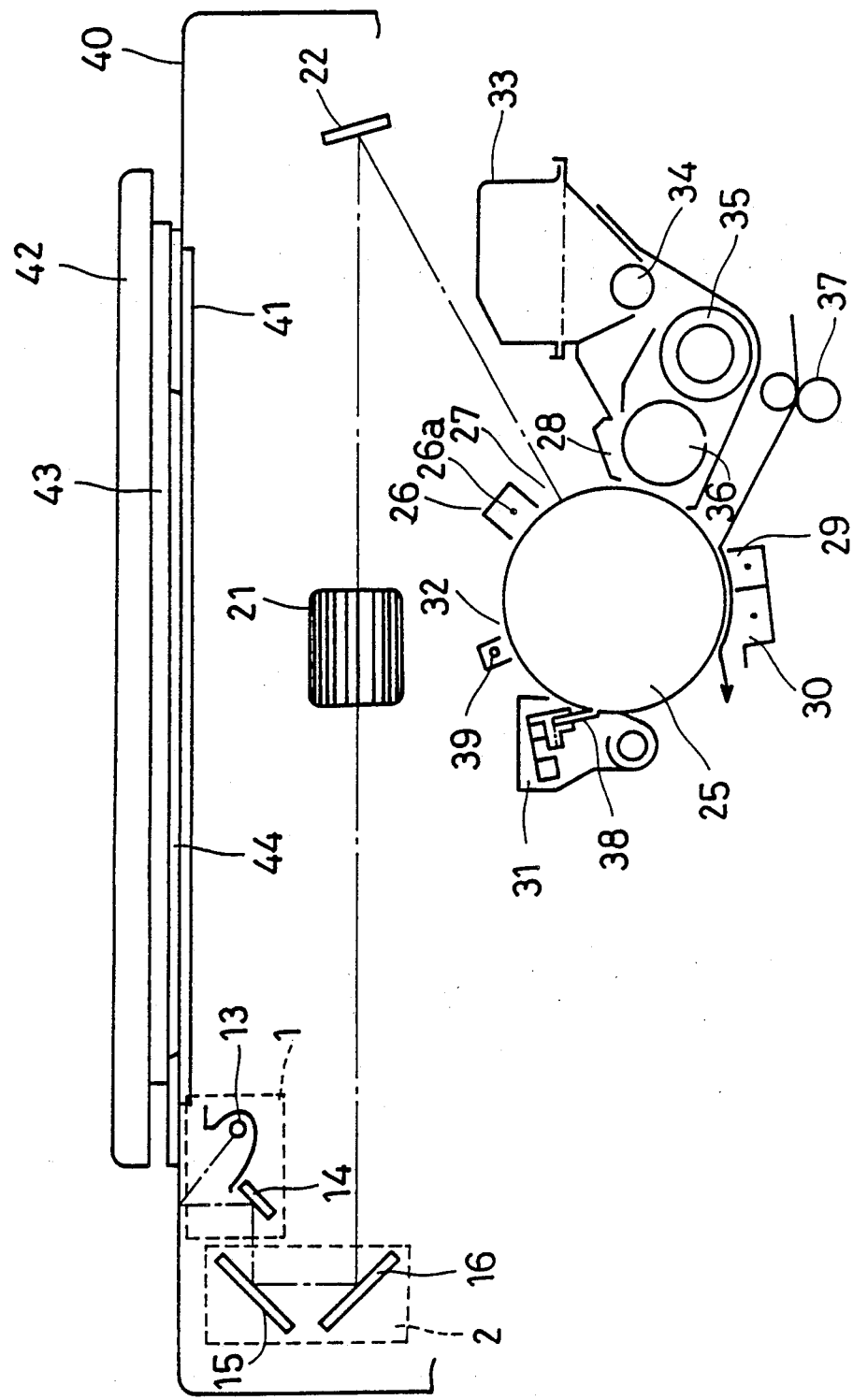
FIG. 5 is a view schematically showing the whole construction of a copying machine incorporating the scanning apparatus of FIG. 3.

FIG. 5 shows the whole construction of the copying machine incorporating the above-described scanning apparatus. In FIG. 5, the light projected from the second moving frame 2 passes through a fixed lens 21 and a stationary fourth reflecting mirror 22, reaching a photoreceptor drum 25, on the surface of which the latent image is produced in response to the scanning operation of the scanning apparatus. The photoreceptor drum 25 is made of a drum base formed with such a material as aluminum and vaporized with a photoreceptor material of selenium group on its surface. Around the photoreceptor drum 25 in its rotational direction, there are provided a main charger 26, an exposure position 27, a developing portion 28, a transferring portion 29, a separating portion 30, a cleaning portion 31 and a discharging portion 32 in succession. At the main charger 26, a charge wire 26a formed with a fine tungsten wire in a U-shaped case is brought near to and along the surface of the photoreceptor drum 25 axially. To this charge wire 26a, high voltage is designed to be applied, thereby the surface of the photoreceptor drum 25 is charged at about 700 V. When the charged photosensitive layer of the surface of the photoreceptor drum 25 is exposed at the exposure position 27, the surface voltage of the exposed part is reduced corresponding to the amount of exposure, thus the latent image is produced. At the developing portion 28, toner powder, which is supplied from a hopper 33 via a toner supply roller 34 made of a sponge roller, and carrier powder (usually iron powder) is mixed by a mixing roller 35, thereafter the mixed powder is attracted to the charged surface of a developing roller 36, and only toner is transferred from the developing roller 36 to the photoreceptor drum 25 by the voltage difference between them, by which the latent image is developed to an actual image. The actual image of toner is transferred onto a sheet of paper which is supplied one by one by a pair of resist rollers 37 at the transferring portion 29. The separating portion 30 applies an alternating (AC) electrical field onto the drum 25 to separate the sheet stuck to the drum 25 by electrostatic force.

After the sheet is separated, the toner remaining on the drum surface is wiped off by the rubber blade 38 of the cleaning portion 31, and the photosensitive layer of the photoreceptor drum 25 is discharged at the discharging portion 32 by receiving light from a discharge lamp 39.

An original 44 is placed on a glass plate 41 at the top of a body frame 40, pressed by a cover plate 42 attaching a buffer sponge 43 on its inside.

Figure 6:
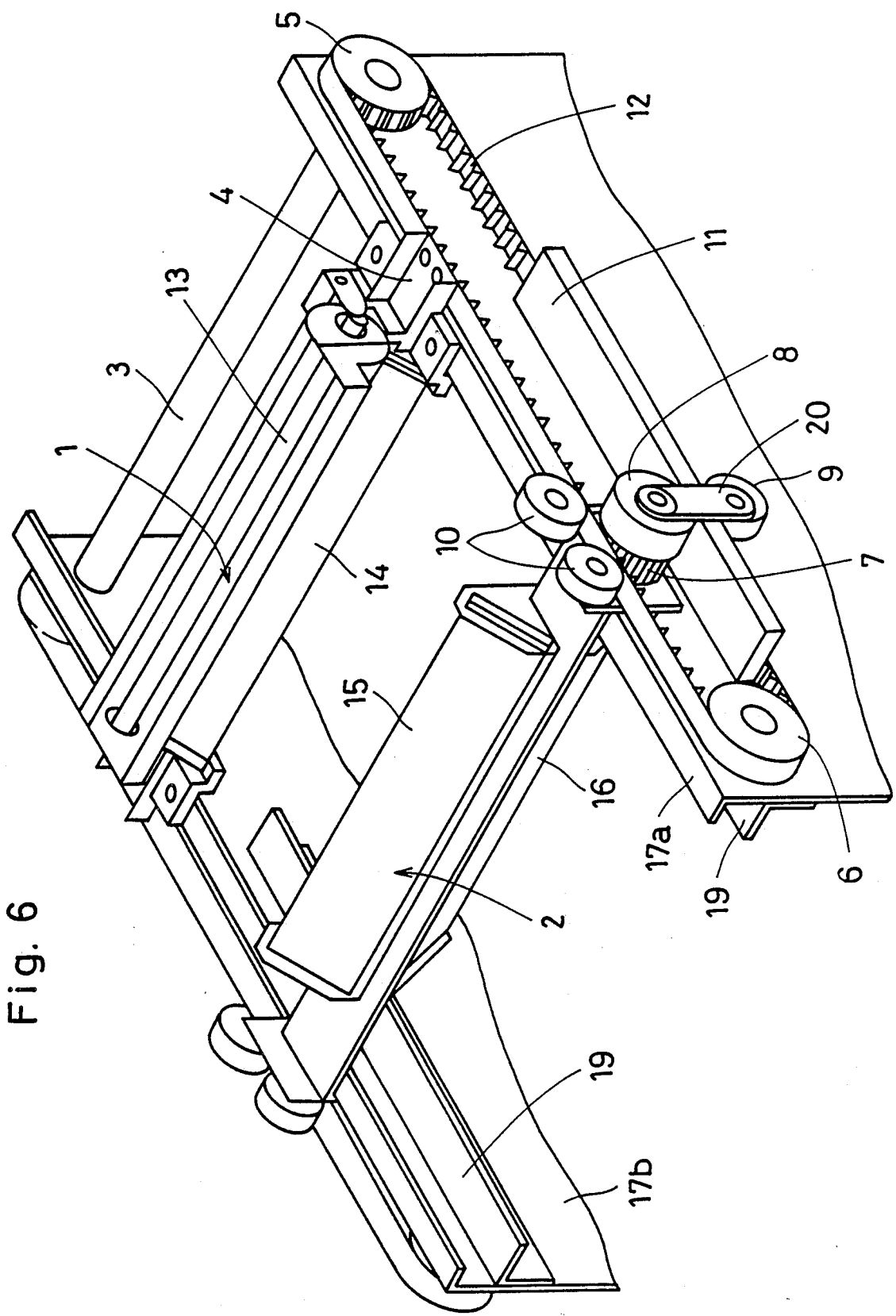
FIG. 6 is a perspective view of a second embodiment of the scanning apparatus having the construction in accordance with the present invention.
Figure 7:
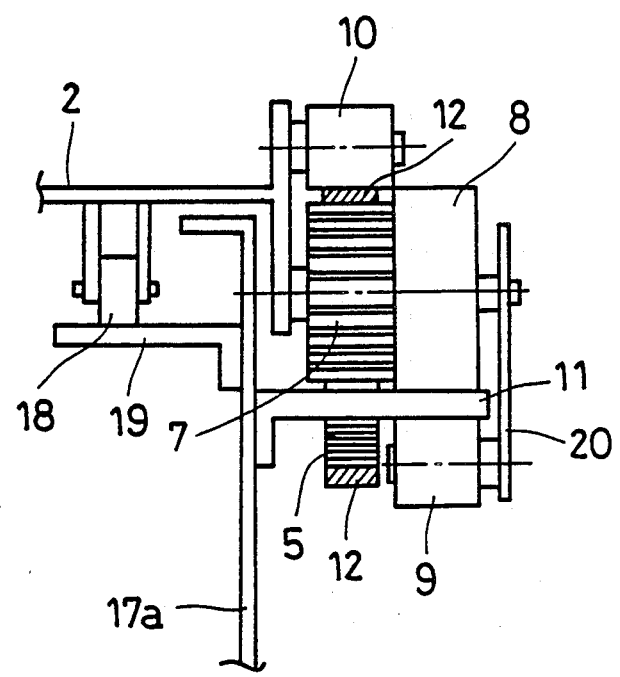
FIG. 7 is a sectional view of the essential portion of the scanning apparatus of FIG. 6.

The second embodiment of the present invention will now be explained referring to FIGS. 6 and 7. The difference of this second embodiment from the above-described first one lies in the following two points: only one pair of the second moving frame driving pulley 7 and the friction roller 8 is provided; and a movable slider 18 which supports the second moving frame 2 and a slider rail 19 for sliding the slider 18 thereon are newly provided at each end portion of the second moving frame 2. The slider 18 is installed at the bottom of each end of the second moving frame 2 as shown in FIG. 7, while the slider rail 19 is installed on each inside of the side plates 17a and 17b as clearly shown in FIG. 6. Therefore, the stable movement of the second moving frame 2 is advantageously obtainable.

According to this embodiment, the slider 18 is installed at each end of the second moving frame 2, however two or more sliders 18 may be installed at each end, otherwise one slider 18 or two or more sliders 18 may be installed only at one end of the second moving frame 2. When the sliders 18 are installed at both ends, the slider rails 19 must be similarly provided on inner surfaces of both the side plates 17a and 17b.

Figure 8:
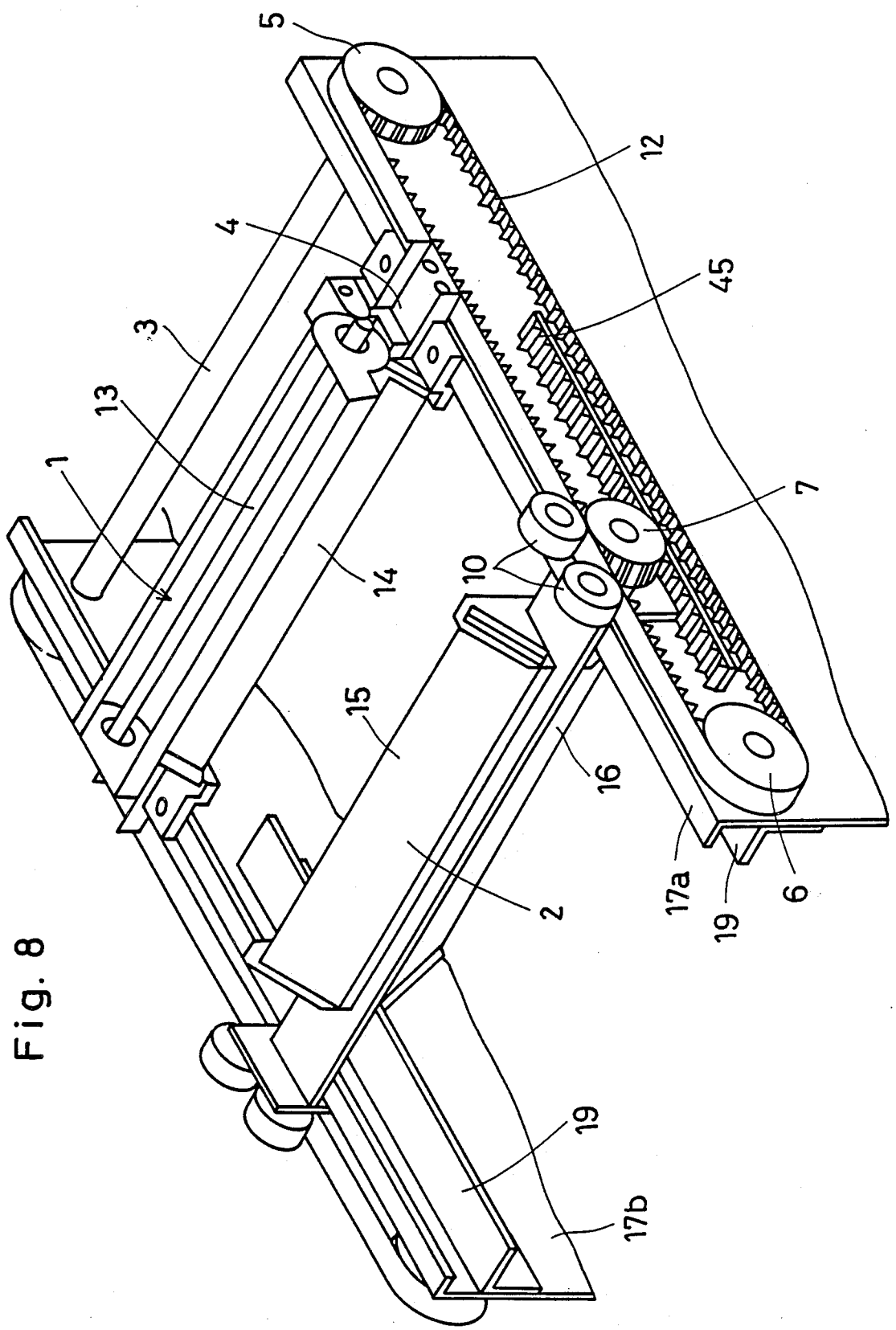
FIG. 8 is a perspective view of a third embodiment of the scanning apparatus having the construction in accordance with the present invention.
Figure 9:
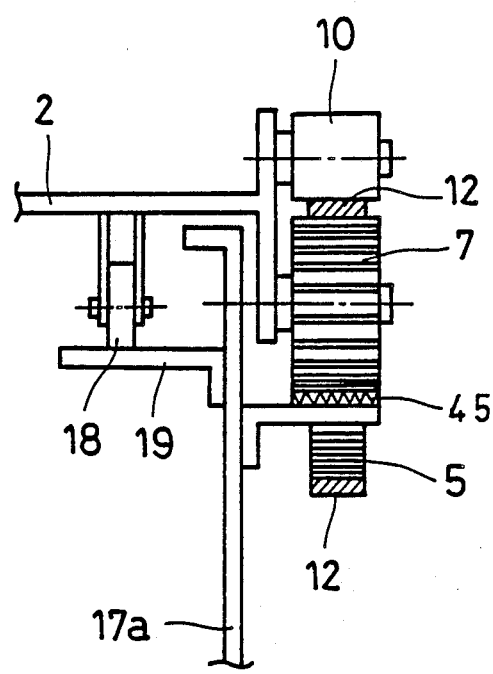
FIG. 9 is a sectional view of the essential portion of the scanning apparatus of FIG. 8.

Next, the third embodiment of the present invention will be explained referring to FIGS. 8 and 9. In the present embodiment, the same parts as FIGS. 3 and 4 shown in the first embodiment are designated by same reference numerals to omit the repeated description. According to the third embodiment, the second moving frame driving pulleys 7 interlocked with the belt 12 by the rotation of the driving pulley 5 rotates on a stationary rack 45 which is disposed along the belt 12 on each outside of the side plates 17a and 17b. The rack 45 is, similarly to the belt 12, provided with teeth having the same pitch as those of the second moving frame driving pulley 7 on its upper surface. Therefore, such engagement between the rack 45 and the second moving frame driving pulley 7 enables the second moving frame driving pulley 7 to rotate stably without causing slippage. In order to prevent noise or vibration from occurring when the second moving frame driving pulley 7 rotates on the rack 45, the rack 45 is preferably formed of rubber material similar to the belt 12.

The rack 45 installed on each outside of the side plates 17a and 17b may be perfectly fixed to each side plate, or may be fixed by using proper installing means so that the installing position may be adjusted as required. In the case of perfectly fixed installment, the adjustment is performed in the process of the assembling work of the apparatus by controlling the installing position.

The exposure unit (movable optical system) constituted with the first moving frame 1 and the second moving frame 2 is designed to reciprocate on the side plates 17a and 17b of the optical system by the drive of the drive transmitting means including the driving pulley 5, driven pulley 6, belt 12, second moving frame driving pulley 7, rack 45 and so on. Furthermore, with respect to the third embodiment, for the purpose of the adjustment of the initial tension of the belt 12, it is preferable to provide installing means on the driven pulley 6 or the side plates 17a and 17b to shift the driven pulley 6 in parallel with the moving direction of the second moving frame 2.

The third embodiment is similar to the second one on the point that the sliders 18 and the slider rails 19 are provided. The movable slider 18 for slidably supporting the second moving frame 2 is disposed at the bottom of each end of the second moving frame 2 as shown in FIG. 9, and the slider rail for sliding the slider 18 thereon is installed on each inside of the side plates 17a and 17b as clearly shown in FIG. 9. The sliders 18 and the slider rails 19 are not always necessary for the construction of the present embodiment, however, desirably provided as required to perform the stable movement of the second moving frame 2. In addition, only one slider 18 or two or more sliders 18 may be provided either only at one end of the second moving frame 2 or both ends thereof.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A scanning apparatus for reading an original image comprising:
    a first moving frame and a second moving frame constituting a movable optical system for reading the original image;
    a toothed belt suspended between a pair of pulleys, said toothed belt being endlessly movable, said first moving frame being fixed;
    a second moving frame driving pulley installed on said second moving frame, and which is driven by said toothed belt;
    a friction roller which rotates in a body with said second moving frame driving pulley; and
    a stationary friction plate installed so as to be brought in contact with said friction roller.

2. A scanning apparatus as claimed in claim 1, wherein a plurality of said second moving frame driving pulleys and friction rollers are provided.

3. A scanning apparatus as claimed in claim 1, wherein said second moving frame is provided with an auxiliary roller for pressing said toothed belt onto said second moving frame driving roller.

4. A scanning apparatus as claimed in claim 1, further comprising a pressing roller which shifts with said second moving frame while pressing said friction plate in cooperation with said friction roller.

5. A scanning apparatus as claimed in claim 1, further comprising a side plate which movably supports said first moving frame and second moving frame.

6. A scanning apparatus as claimed in claim 5, wherein said side plate is provided with a slider rail, and said second moving frame is provided with a slider which slides on said slider rail.

7. A scanning apparatus for reading an original image comprising:
    a first moving frame and a second moving frame constituting a movable optical system for reading the original image;
    a toothed belt suspended between a pair of pulleys, said toothed belt being endlessly movable, said first moving frame being fixed;
    a second moving frame driving pulley installed on said second moving frame, and which is driven by said toothed belt; and
    a stationary rack positioned along said toothed belt, and which is engaged with said second moving frame driving pulley.

8. A scanning apparatus as claimed in claim 7, wherein said second moving frame is provided with an auxiliary roller for pressing said toothed belt onto said second moving frame driving roller.

9. A scanning apparatus as claimed in claim 7, further comprising a side plate which movably supports said first moving frame and second moving frame.

10. A scanning apparatus as claimed in claim 9, wherein said side plate is provided with a slider rail, and said second moving frame is provided with a slider which slides on said slider rail.

* * * * *